US011764642B2

(12) United States Patent
Oliver

(10) Patent No.: US 11,764,642 B2
(45) Date of Patent: Sep. 19, 2023

(54) REEL ASSEMBLY WITH INTERNAL MOTOR AND GEAR BOX

(71) Applicant: Big Jon Sports, Inc., Interlochen, MI (US)

(72) Inventor: Mark Oliver, Fife Lake, MI (US)

(73) Assignee: Big Jon Sports, Inc., Interlochen, MI (US)

( * ) Notice: Subject to any disclaimer, the term of this patent is extended or adjusted under 35 U.S.C. 154(b) by 685 days.

(21) Appl. No.: 16/792,590

(22) Filed: Feb. 17, 2020

(65) Prior Publication Data

US 2021/0257881 A1   Aug. 19, 2021

(51) Int. Cl.
H02K 7/00 (2006.01)
H02K 7/116 (2006.01)
A01K 91/08 (2006.01)

(52) U.S. Cl.
CPC ............. *H02K 7/116* (2013.01); *A01K 91/08* (2013.01)

(58) Field of Classification Search
CPC ................................ H02K 7/116; A01K 91/08
See application file for complete search history.

(56) References Cited

U.S. PATENT DOCUMENTS

| | | | | |
|---|---|---|---|---|
| 5,581,136 A * | 12/1996 | Li | ........................... | H02K 29/08 310/67 R |
| 6,974,399 B2 * | 12/2005 | Lo | ........................ | B60L 15/2054 475/5 |
| 8,245,804 B2 * | 8/2012 | van Rooij | ................ | B62M 6/65 180/65.6 |
| 9,855,992 B1 * | 1/2018 | Liang | .................... | B60K 17/046 |
| 11,148,918 B2 * | 10/2021 | Vighi | ........................ | B66D 1/22 |
| 2005/0029033 A1 * | 2/2005 | Rip | ............................. | B62J 1/08 180/220 |
| 2005/0104469 A1 | 5/2005 | Zepp et al. | | |
| 2005/0176542 A1 * | 8/2005 | Lo | ............................ | B62M 7/12 475/5 |
| 2014/0117136 A2 * | 5/2014 | Morgan | ............. | B65H 75/4447 242/381.5 |
| 2015/0284222 A1 * | 10/2015 | Hall | ........................ | B66D 1/58 254/266 |
| 2016/0244293 A1 | 8/2016 | Firth | | |
| 2016/0311642 A1 * | 10/2016 | Blair | .................. | B65H 75/4442 |
| 2018/0201488 A1 * | 7/2018 | Zheng | ....................... | B66D 1/28 |

(Continued)

FOREIGN PATENT DOCUMENTS

EP  2666595 A1  11/2013
EP  3131185 A1  2/2017

*Primary Examiner* — Jacob M Amick
*Assistant Examiner* — Sherman D Manley
(74) *Attorney, Agent, or Firm* — Price Heneveld LLP

(57) ABSTRACT

A powertrain assembly comprises a motor assembly having a motor housing with a rotor assembly at least partially axially aligned with a stator and disposed within an interior portion of the motor housing. A motor shaft is coupled to the rotor assembly. The rotor assembly is configured to rotate within the interior portion of the motor housing. A gear system having a ring gear is disposed within the stator and at least partially axially aligned with the stator. The gear system further includes first and second gears. The first gear is configured to drive the second gear within the interior portion of the ring gear. An output shaft is operably coupled to the second gear and extending outwardly from the interior portion of the motor housing.

7 Claims, 9 Drawing Sheets

(56) References Cited

U.S. PATENT DOCUMENTS

| | | | |
|---|---|---|---|
| 2019/0016571 A1* | 1/2019 | Thirunarayana | H02K 7/1016 |
| 2020/0189889 A1* | 6/2020 | Vighi | B66D 1/22 |
| 2021/0257881 A1* | 8/2021 | Oliver | A01K 91/08 |
| 2021/0309059 A1* | 10/2021 | Ker | B60K 6/26 |
| 2021/0320561 A1* | 10/2021 | Tucker | H02K 1/2786 |
| 2021/0362584 A1* | 11/2021 | Liu | B60K 17/046 |

\* cited by examiner

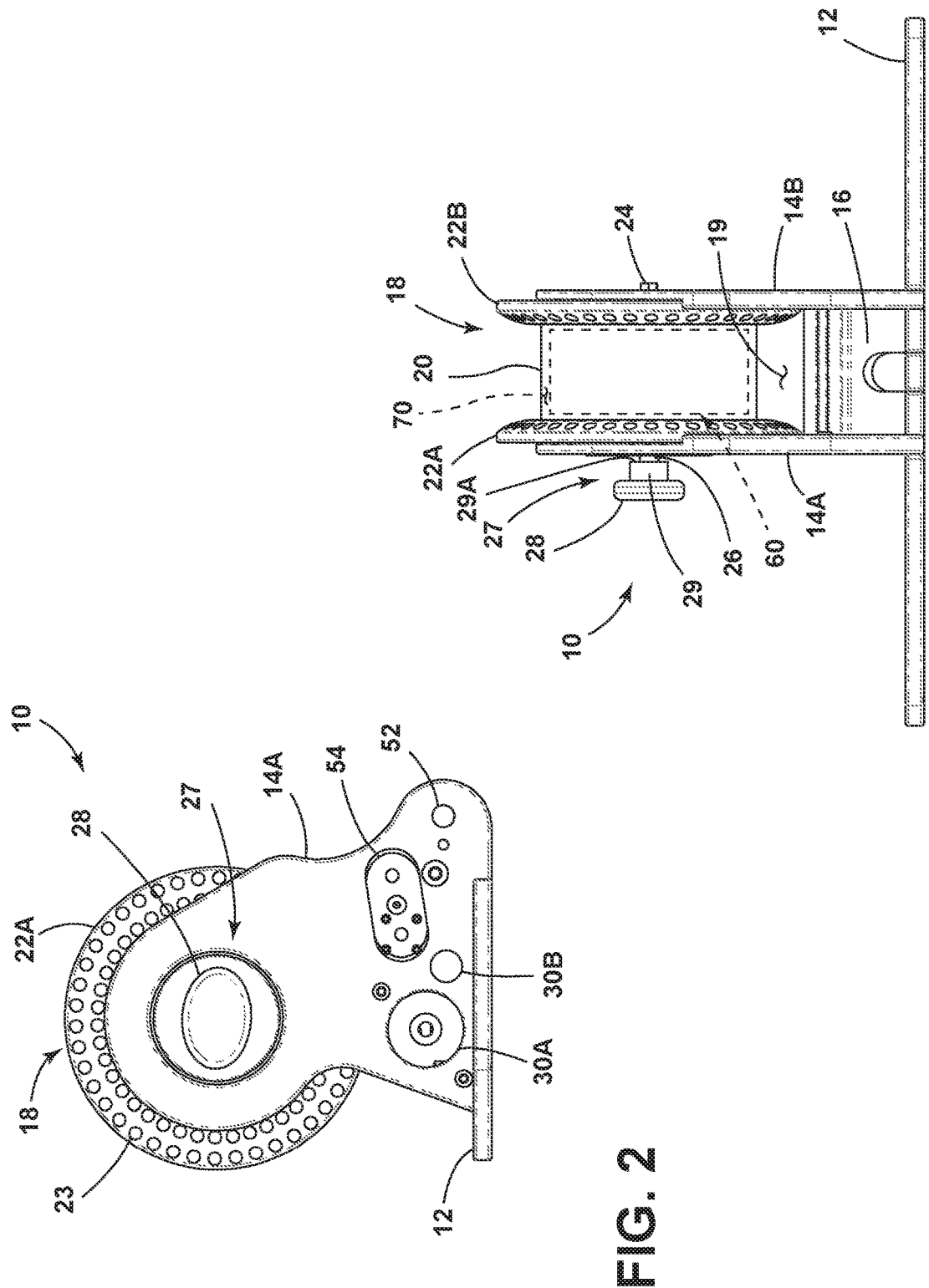

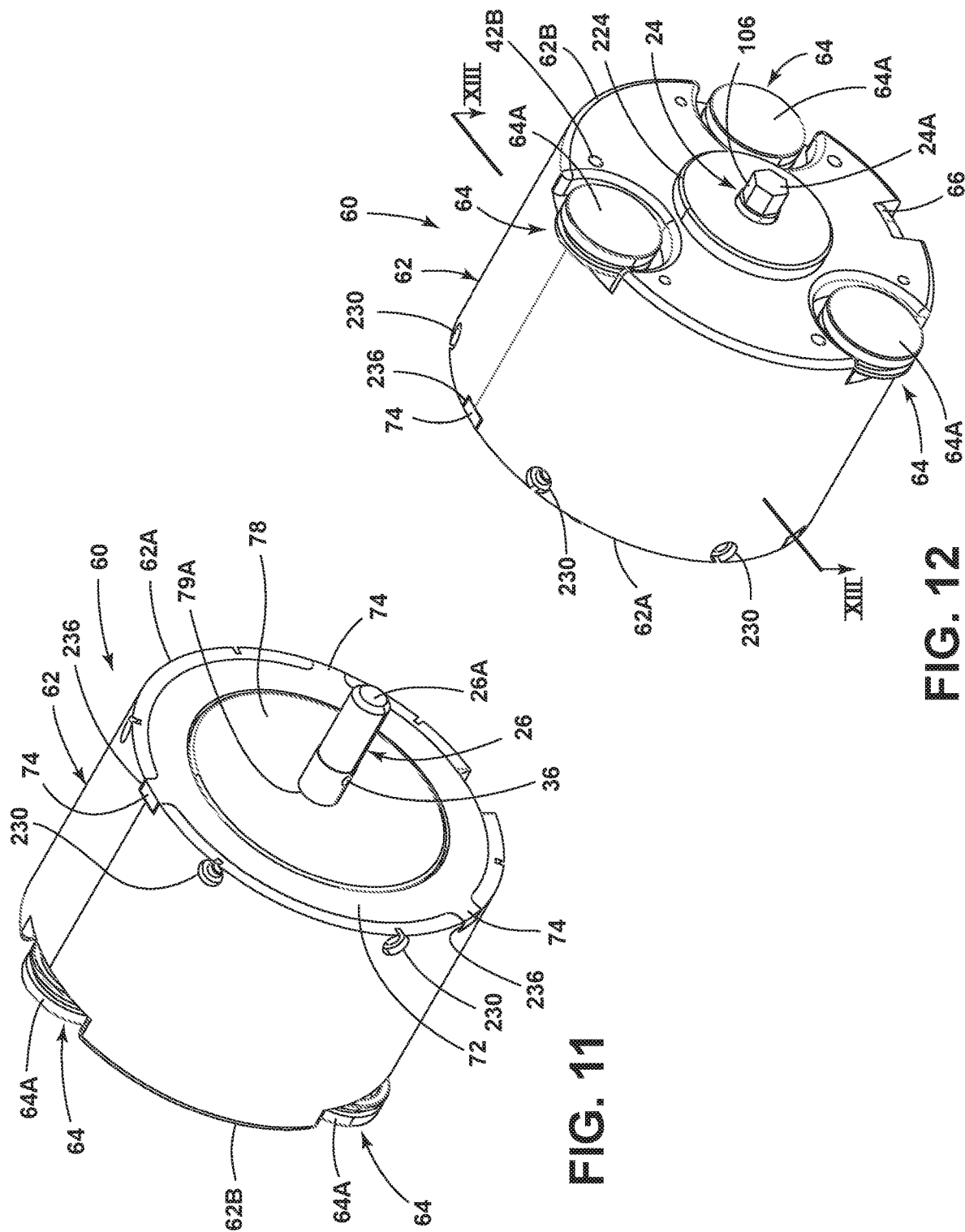

REEL ASSEMBLY WITH INTERNAL MOTOR AND GEAR BOX

FIELD OF THE DISCLOSURE

The present disclosure generally relates to downrigger assemblies, and more particularly to motorized downrigger assemblies.

BACKGROUND OF THE DISCLOSURE

Downrigger assemblies may be utilized while fishing using a trolling method. Typically, downrigger assemblies include a reel assembly configured to release or withdraw a desired amount of a first line. A weight may be coupled to a distal end of the first line to maintain the first line at a desired depth in the water. Typically, the weight also includes a release clip coupled to a second line (e.g., fishing line) coupled to a fishing pole. Bait or a lure may be attached to a distal end of the second line. When a fish is hooked on the distal end of the second line, the second line may release from the first line and the fish may be reeled in using the fishing pole.

Motorized downrigger assemblies may be desired for reeling in the weight. More specifically, compact motorized systems may be desired for ease of use and improved packaging. Additionally, a gearbox may be desired to provide greater torque so the downrigger assembly may be compatible with heavier weights.

SUMMARY OF THE DISCLOSURE

According to one aspect of the present disclosure, a powertrain assembly comprises a motor assembly having a motor housing with a rotor assembly at least partially axially aligned with a stator and disposed within an interior portion of the motor housing. A motor shaft is coupled to the rotor assembly. The rotor assembly is configured to rotate within the interior portion of the motor housing. A gear system having a ring gear is disposed within the stator and at least partially axially aligned with the stator. The gear system further includes first and second gears. The first gear is configured to drive the second gear within the interior portion of the ring gear. An output shaft is operably coupled to the second gear and extending outwardly from the interior portion of the motor housing.

According to another aspect of the present disclosure, a reel assembly comprises an annular hub having a hollow interior bore. A motor assembly having a motor housing is sized to be received within the hollow interior bore of the annular hub. A rotor assembly is disposed around the stator within an interior cavity of the motor housing for rotation within the interior cavity of the motor housing. A gear system is disposed within the interior cavity of the motor housing, and an output shaft interconnects the annular hub and the gear system.

According to a third aspect of the present disclosure a reel assembly comprises a hub having a body portion surrounding an interior cavity. A motor assembly is axially aligned within the hub. The motor assembly includes a stator and a rotor assembly positioned within a motor housing. The motor housing is received within the interior cavity of the hub and the hub is configured to rotate with respect to the motor housing.

These and other aspects, objects, and features of the present disclosure will be understood and appreciated by those skilled in the art upon studying the following specification, claims, and appended drawings.

BRIEF DESCRIPTION OF THE DRAWINGS

In the drawings:

FIG. 2 is a side elevational view of the downrigger assembly of FIG. 1 as assembled;

FIG. 3 is a front elevational view of the downrigger assembly of FIG. 2;

FIG. 11 is a top perspective view of the motor assembly of FIG. 9;

FIG. 12 is a top perspective view of the motor assembly of FIG. 9; and

DETAILED DESCRIPTION OF THE EMBODIMENTS

For purposes of description herein, the terms "upper," "lower," "right," "left," "rear," "front," "vertical," "horizontal," and derivatives thereof shall relate to the disclosure as oriented in FIG. 3. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Figure 13:
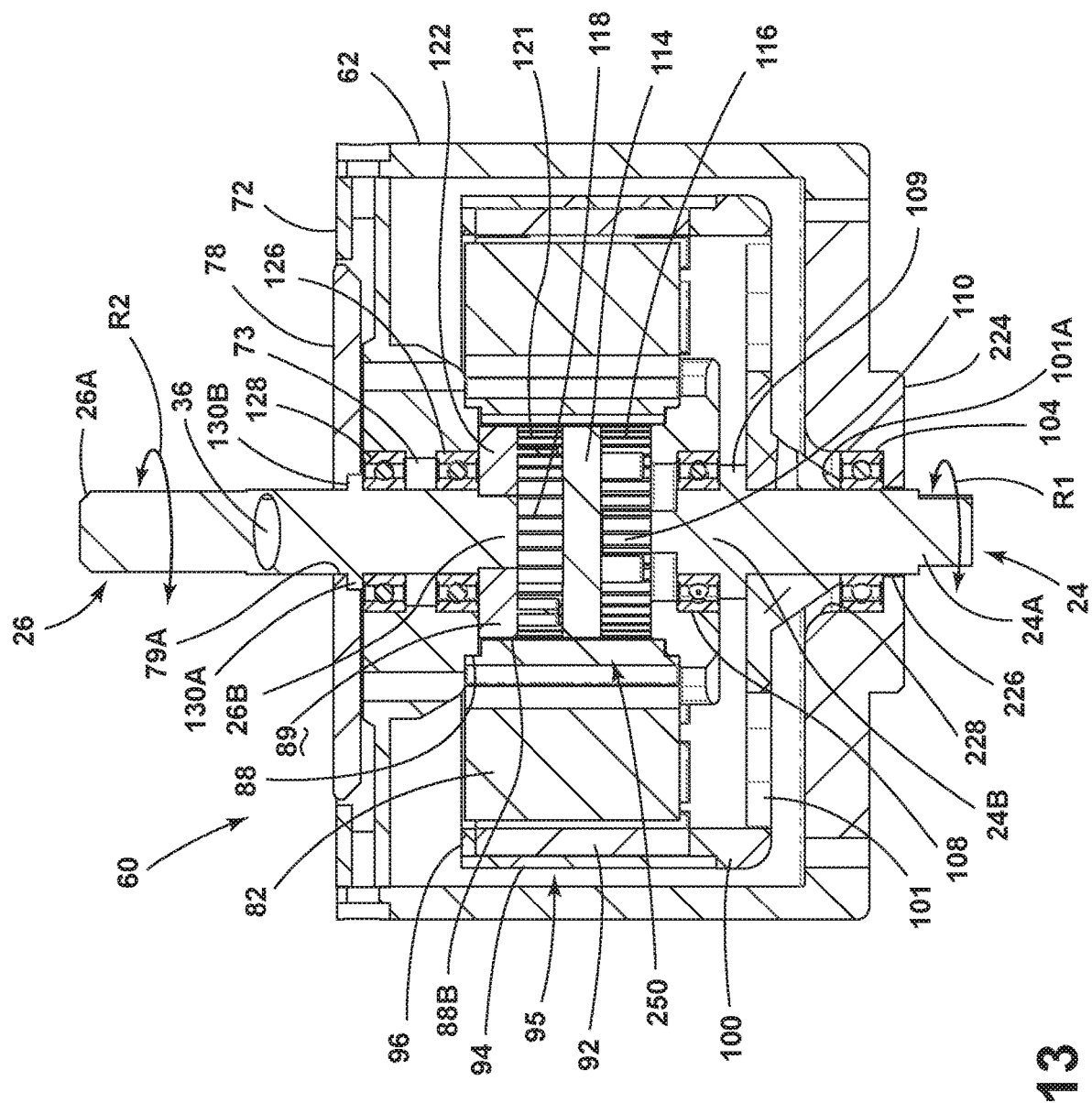
FIG. 13 is a cross-sectional view of the motor assembly of FIG. 12 taken at line XIII.

Referring generally to FIGS. 1 through 13, a downrigger assembly 10 is provided including a reel assembly 18. The reel assembly 18 includes a motor assembly 60 disposed within a hollow interior bore 70 of a hub 20 (FIG. 3). In some embodiments, the motor assembly 60 includes a gear system 250 disposed within the motor assembly 60 (FIG. 13).

In the illustrated embodiment, the motor assembly 60 is coupled to the reel assembly 18 of the downrigger assembly 10. However, it is contemplated that the motor assembly 60 of the present disclosure may be coupled to any device for powering the same without departing from the scope of the current disclosure. For example, contemplated devices may include, but are not limited to, portable winches, wheel assemblies for electric vehicles, personal motorized devices, etc. In various embodiments, the motor assembly 60 is designed such that it may be carried by the user in a substantially portable manner and may include or be configured to couple to a power source (e.g., a portable power source such as a battery). Accordingly, the motor assembly 60 may be removably coupled to a variety of devices as desired by the user.

Figure 1:
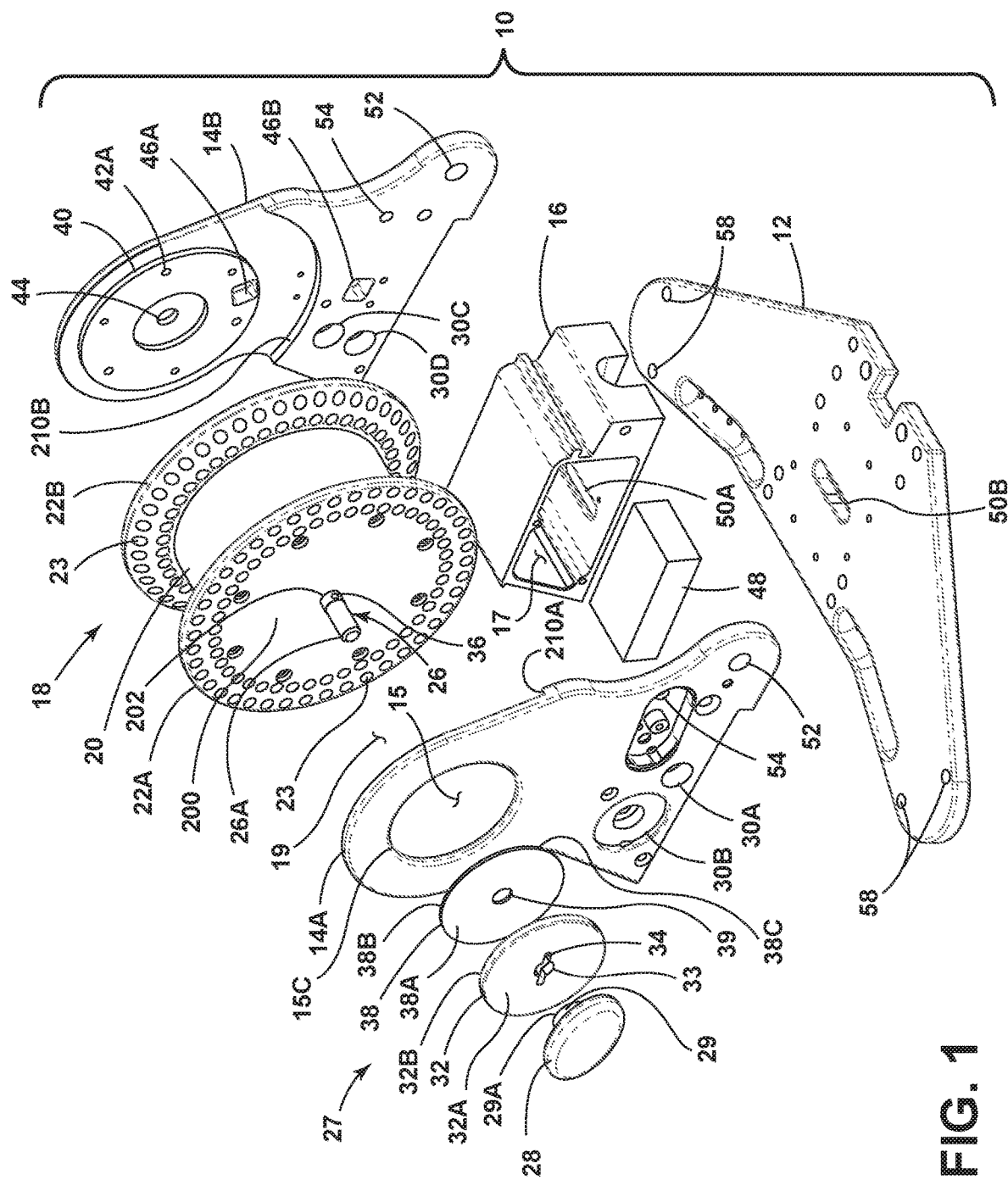
FIG. 1 is an exploded perspective view of a downrigger assembly.

Referring now to FIGS. 1 through 3, the downrigger assembly 10 is provided. The downrigger assembly 10 includes a base 12, a first stanchion 14A coupled to the base 12, and a second stanchion 14B coupled to the base 12 and substantially aligned with the first stanchion 14A. The first and second stanchions 14A, 14B upwardly extend from the base 12 and define a receiving area 19 therebetween. The downrigger assembly 10 also includes an enclosure 16 disposed between the first stanchion 14A and the second stanchion 14B and defining a compartment 17 for housing various electrical components for operating the motor assembly 60.

In some embodiments, at least one of the first stanchion 14A and the second stanchion 14B also include a boom attachment feature 52, such that a boom may be coupled to the downrigger assembly 10. The boom may include a swivel member disposed between the first stanchion 14A and the second stanchion 14B such that the boom may be raised and lowered between stowed and deployed positions.

In some embodiments, the downrigger assembly 10 includes a line guide attachment feature 54 on at least one of the first stanchion 14A and the second stanchion 14B configured to couple a line guide to the downrigger assembly 10. The line guide may be configured to distribute the line on the reel assembly 18 in an even manner to prevent tangling of the line and allow the line to be disposed about the reel assembly 18 in evenly distributed, compact, and efficient manner. In some embodiments, the line guide attachment feature 54 includes a line guide motor bracket. The line guide motor bracket is configured to couple a line-guide motor to one of the first stanchion 14A and the second stanchion 14B and is configured to move the line guide laterally between the first stanchion 14A and the second stanchion 14B such that the line guide may better distribute the line along the hub 20 of the reel assembly 18.

The base 12 of the downrigger assembly 10 may also include one or more rod holder attachment features 58 for coupling one or more rod holders to the downrigger assembly 10.

The reel assembly 18 is configured to be received in the receiving are 19 between the first stanchion 14A and the second stanchion 14B. The reel assembly 18 includes the hub 20 coupled to a first cover 22A and a second cover 22B at opposed sides of the hub 20. In various embodiments, the reel assembly 18 is configured to rotate with respect to the first stanchion 14A and the second stanchion 14B within the receiving area 19 and act as a spool to receive a length of line wrapped around the hub 20. As best shown in FIG. 3, the first cover 22A and the second cover 22B radially extend outward from the hub 20 and may have a curved inner surface 20B for guiding line toward the center of the reel assembly 18 to be received on the hub 20. In some embodiments, the reel assembly 18 may be used in an environment where the line may be introduced to water or other moisture. Accordingly, the first cover 22A and the second cover 22B may define at least one vent 23 for allowing moisture and/or air to pass through the at least one vent 23. In some embodiments, the at least one vent 23 may allow for increased heat dissipation in environments where the line is heated (e.g., by means of friction during the spooling process).

In some embodiments, the downrigger assembly 10 includes a clutch assembly 27. Typically, the clutch assembly 27 includes a clutch knob 28 coupled to an output shaft 26 extending through the first cover 22A and the first stanchion 14A. In some embodiments, the output shaft 26 includes a threaded portion coupled to a threaded bore of the clutch knob 28, such that as the clutch knob 28 is rotated, the clutch knob 28 moves linearly with respect to the output shaft 26 as threadingly engaged therewith. Accordingly, the clutch knob 28 may be tightened until an inner surface 29A of a stem portion 29 of the clutch knob 28 engages an outer surface 32A of a clutch plate 32. The clutch plate 32 includes a receiving aperture 33 having a pin slot 34. In assembly, the output shaft 26 is received through the receiving aperture 33 of the clutch plate 32. The pin slot 34 is configured to engage a pin extending through a pin hole 36 disposed through the output shaft 26. Accordingly, the clutch plate 32 and the output shaft 26 are rotationally fixed to one another. The clutch assembly 27 may further include a clutch disk 38 disposed between the clutch plate 32 and an outer surface 200 of the first cover 22A. The clutch disk 38 includes an outer surface 38A that abuts an inner surface 32B of the clutch plate 32 in assembly, and an inner surface 38B that abuts the outer surface 200 of the first cover 22A in assembly. The clutch disk 38 further includes a receiving aperture 39 through which the output shaft 26 is received. As the clutch knob 28 is tightened, the clutch plate 32 presses the clutch disk 38 against outer surface 200 of the first cover 22A and acts as a friction clutch to rotationally couple the output shaft 26 to the reel assembly 18 at the first cover 22A. In this way, the reel assembly 18 is operably coupled to the output shaft 26 through the clutch assembly 27. In some embodiments, the force and/or the contact area between the clutch plate 32, the clutch disk 38, and the first cover 22A may increase gradually as the clutch disk 38 is deformed allowing the clutch assembly 27 to be applied at varying degrees to provide a desired degree of slip between the output shaft 26 and the first cover 22A. Typically the clutch disk 38 comprises a material including Kevlar, however, several materials are contemplated including, but not limited to, ceramic, resin, semi-metallic materials (e.g., materials including steel wire, graphite, and/or copper), resins, and metallic wire and resin composites. In some embodiments, the clutch disk 38 is configured to wear down as the clutch assembly 27 is used and may be replaceable by the user as needed. Accordingly, in some embodiments, the clutch disk 38 may have a lower hardness as compared with the clutch plate 32 and the outer surface 200 of the first cover 22A such that clutch disk 38 wears down prior to the inner surface 32B of the clutch plate 32 and/or the outer surface 200 of the first cover 22A.

As further shown in FIG. 1, the first stanchion 14A includes a receiving aperture 15 having an outer perimeter 15C that closely matches the outer perimeter 38C of the clutch disk 38. The clutch assembly 27 interconnects the reel assembly 18 to the output shaft 26 at or near the receiving aperture 15 of the first stanchion 14A.

Figure 7:
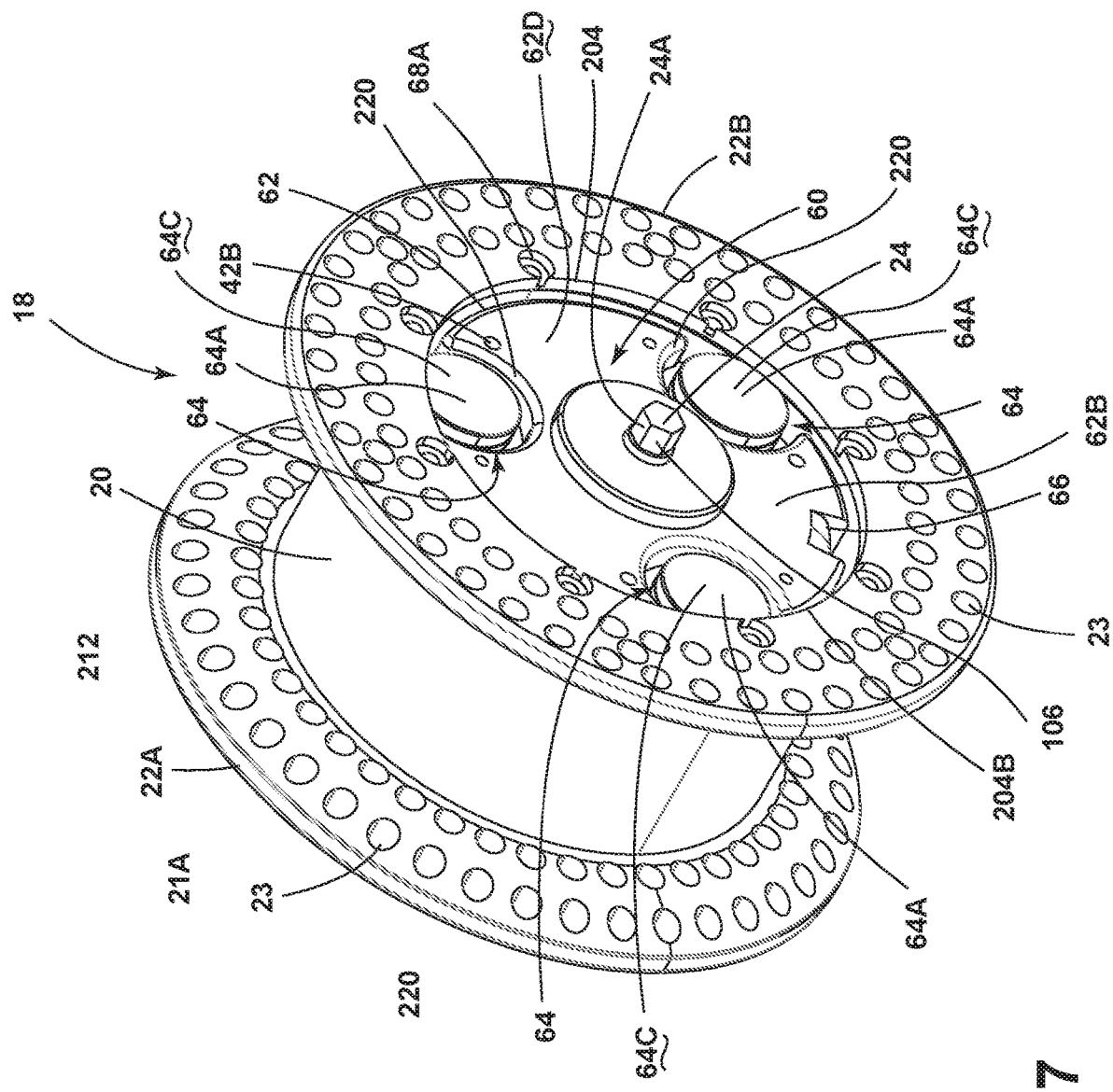
FIG. 7 is a top perspective view of the reel assembly of FIG. 4 in an assembled condition.

The second stanchion 14B includes a motor bracket 40 having first motor attachment features 42A configured to couple to second motor attachment features 42B of the motor assembly 60 (FIG. 7). In this way, the motor assembly 60 is substantially fixed with respect to the second stanchion 14B. The motor bracket 40 also defines a motor shaft aperture 44 through which a motor shaft 24 extends (FIG. 3). In some embodiments, the downrigger assembly 10 includes a brake coupled to the motor shaft 24 and/or the second stanchion 14B to selectively decrease the speed of the motor shaft 24 and/or to resist inadvertent movement of the motor shaft 24. In various embodiments, the brake may also help to dampen or gradually slow the rotation of the motor shaft 24 to prevent jolting/jerking of the reel assembly 18 as rotation of the reel assembly 18 is stopped. Suitable brakes may include, but are not limited to, disk brakes, drum brakes, internal expanding brakes, external contracting brakes, band-type brakes, electromagnetic brakes, and other suitable braking systems.

In some embodiments, the second stanchion 14B defines a first lead wire aperture 46A through which one or more motor lead wires may extend. The second stanchion 14B may further include a second lead wire aperture 46B extending through the second stanchion 14B proximal the enclosure 16 through which the one or more motor lead wires may extend into the compartment 17 of the enclosure 16.

As further shown in FIG. 1, the first and second stanchions 14A, 14B include guide portions 210A, 210B, respectively, that help to guide rotation of the reel assembly 18 in assembly. The guide portions 210A, 210B define arcuate lip portions disposed on inner surfaces of the first and second stanchions 14A, 14B, respectively.

In various embodiments, the downrigger assembly 10 includes a controller 48 operably connected to the motor assembly 60 (e.g., via the one or more lead wires) and to one or more motor controls. In some embodiments, the first stanchion 14A and/or the second stanchion 14B may include one or more motor control attachment features. As shown in FIG. 1, the first stanchion 14A includes a first motor control attachment feature 30A and a second motor control attachment feature 30B. As further shown in FIG. 1, the second stanchion 14B includes a third motor control attachment feature 30C and a fourth motor control attachment feature 30D. The first motor control attachment feature 30A is configured to receive a power switch for providing an input to the controller 48 to turn on or off the electronics. In some embodiments, the power switch may provide power to the controller 48. The second motor control attachment feature 30B is configured to receive a knob control operably connected to the controller 48. The knob control is configured to provide a length input to the controller 48 related to a desired length of line to be reeled in or released from the reel assembly 18. The controller 48 may be configured to receive the length input and convert it into a desired number of rotations to be made by the output shaft 26 based on the size of the hub 20 and the gear ratio between the motor shaft 24 and the output shaft 26. The third motor control attachment feature 30C and the fourth motor control attachment feature 30D are configured to receive an inward directional input control and an outward directional input control respectively. By utilizing the various motor controls, the user may operate the motor assembly 60 to release or withdraw a desired length of line from the reel assembly 18. For example, if the user desired to release 30 meters of line, the user would turn on the power to the motor assembly 60 via the power switch coupled to the first motor control attachment feature 30A. The user would then select 30 meters of desired length via the control knob coupled to the second motor control attachment feature 30B. Once the desired length is selected, the user would release the line by activating the outward directional input control coupled to the fourth motor control attachment feature 30D. The controller 48, having received the desired inputs, would send power to the motor assembly 60 via the one or more lead wires to activate the motor assembly 60 to rotate the reel assembly 18 a select number of rotations corresponding to the desired length and in the outward direction. As noted above, the controller 48 can calculate an automatic dampening cycle that will slow rotation of the reel assembly 18, as powered by the motor assembly 60, as a desired amount of line is let out or taken in. In this way, sudden stoppage of the rotation of the reel assembly 18 is avoided.

In some embodiments, the controller 48 is configured to communicate with a user device to receive inputs and/or transmit signals. Exemplary user devices include, but are not limited to, phones, tablets, laptops, electronic wearable devices, computers, and other suitable electronic devices. In some embodiments, the controller 48 is configured to communicate with the user device wirelessly (e.g., via Bluetooth or Wifi). In other embodiments, the controller 48 is configured to physically couple to the user device (e.g., via a universal serial bus ("USB") cable or similar connector).

In various embodiments, the enclosure 16 includes a first power cord aperture 50A and the base 12 includes a second power cord aperture 50B through which one or more cables may extend. In the shown embodiment, the first power cord aperture 50A and the second power cord aperture 50B are configured to be substantially aligned such that power cords may extend through the first power cord aperture 50A and the second power cord aperture 50B. In some embodiments, additional wiring (e.g., a USB cable) may extend through the power cord aperture. In some embodiments, the downrigger assembly 10 may include the power source (e.g., a battery) configured to provide power to the controller 48 and/or motor assembly 60. In some embodiments, the power source may be housed within the enclosure 16 and is configured to be charged via a charge cable extending from the enclosure 16. In other embodiments, the power source may be housed outside of the enclosure 16, and the downrigger assembly 10 may include a connector such that the power source may be disconnected when depleted and a different power source may be connected.

Figure 4:
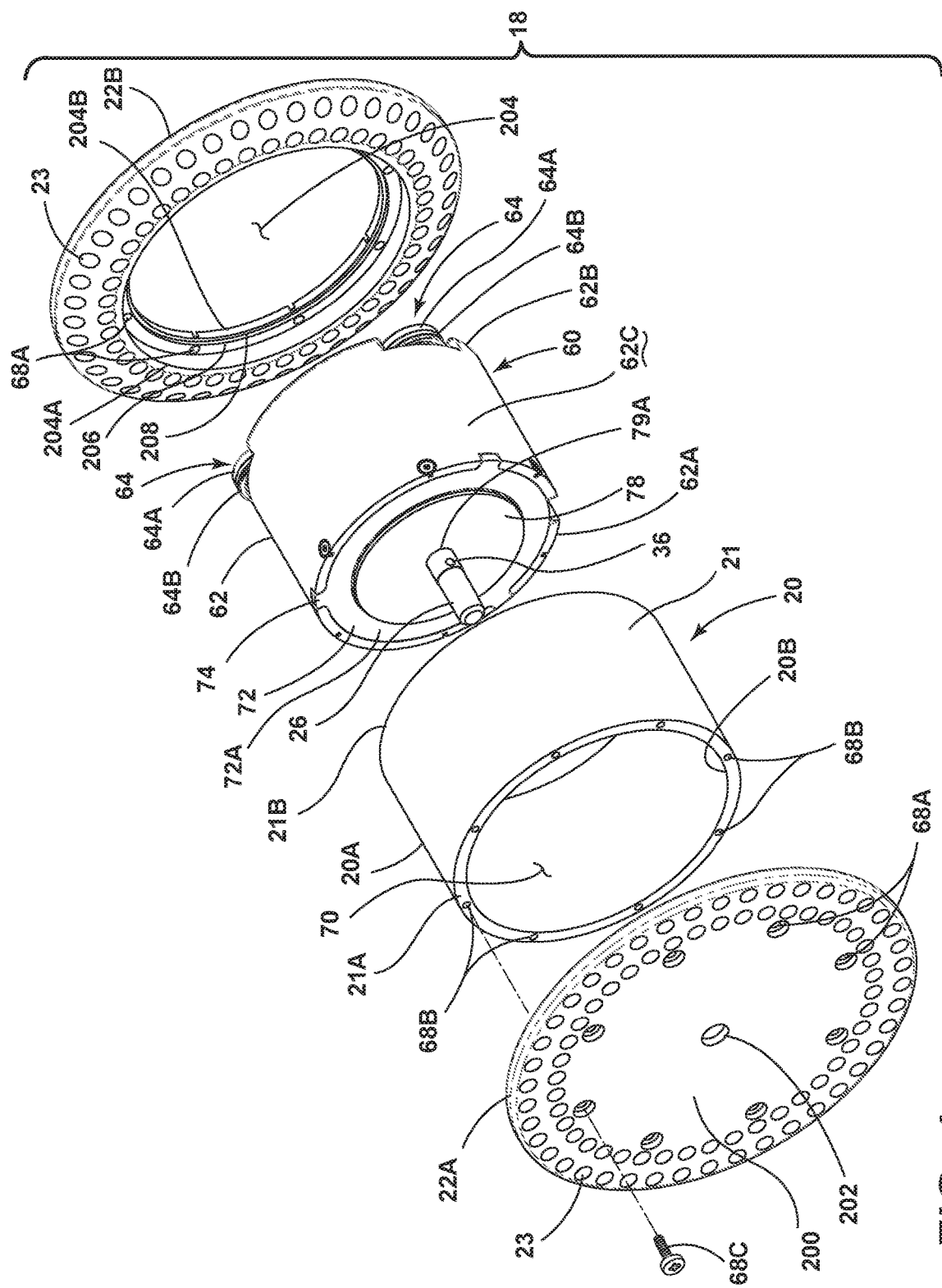
FIG. 4 is an exploded perspective view of a reel assembly.

Referring now to FIG. 4, the reel assembly 18 is shown in an exploded view. In the exploded view of the reel assembly 18, the motor assembly 60 is shown as being packaged to be received within a hollow interior bore 70 of the hub 20. The hub 20 shown in FIG. 4 is an annular hub having a body portion 21 with a curved outer surface 20A and the curved inner surface 20B. The curved inner surface 20B defines the hollow interior bore 70 of the hub 20. The hollow interior bore 70 of the hub 20 is a generally circular bore as defined by the curved inner surface 20B of the hub 20. The hollow interior bore 70 defines an interior cavity for the hub 20 for receiving the motor assembly 60 that may include other configurations other than the circular bore shown in FIG. 4. The first cover 22A and the second cover 22B include one or more cover attachment features 68A configured to couple the first cover 22A and the second cover 22B to the hub 20 at opposed first and second sides 21A, 21B of the hub 20. As shown, the hub 20 includes a number of mounting apertures 68B recessed into the body portion 21 of the hub 20 that are configured to receive fasteners 68C. The mounting apertures 68B are shown disposed on the first side 21A of the hub 20, and are also contemplated to be disposed in a similar configuration on the second side 21B of the hub 20 for coupling the second cover 22B to the second side 21B of the hub 20. Thus, the fasteners 68C are received through the cover attachment features 68A disposed through the first and second covers 22A, 22B, and then further received within the mounting apertures 68B of the hub 20 at the respective opposed first and second sides 21A, 21B of the hub 20. The first cover 22A includes a centrally disposed receiving aperture 202 through which a first portion 26A of the output shaft 26 outwardly extends in assembly, as best shown in FIG. 1.

As further shown in FIG. 4, the second cover 22B includes a receiving aperture 204 having first and second sides 204A, 204B. The first side 204A includes an inwardly extending lip 206 through which the cover attachment features 68A are disposed for coupling the second cover 22B to the second side 21B of the hub 20. An inner rim 208 further extends into the receiving aperture 204 adjacent the second side 204B and defines a bearing surface for reel bearings 64 of the motor assembly 60, as further described below. The receiving aperture 204 provides access to the motor assembly 60 through the second cover 22B. In some embodiments, the receiving aperture 204 may be configured to at least partially receive the motor bracket 40 (FIG. 1) of the second stanchion 14B. The receiving aperture 204 also provides access to the second motor attachment features 42B (FIG. 7), such that the motor assembly 60 may be fixedly coupled to the second stanchion 14B. Additionally, the receiving aperture 204 allows the one or more lead wires to extend from a lead wire slot 66 (FIG. 7) through the first lead wire aperture 46A (FIG. 1). In some embodiments, the receiving aperture 204 may include radially inwardly extending stabilizing features to maintain the motor assembly 60 laterally within the reel assembly 18.

Figure 6:
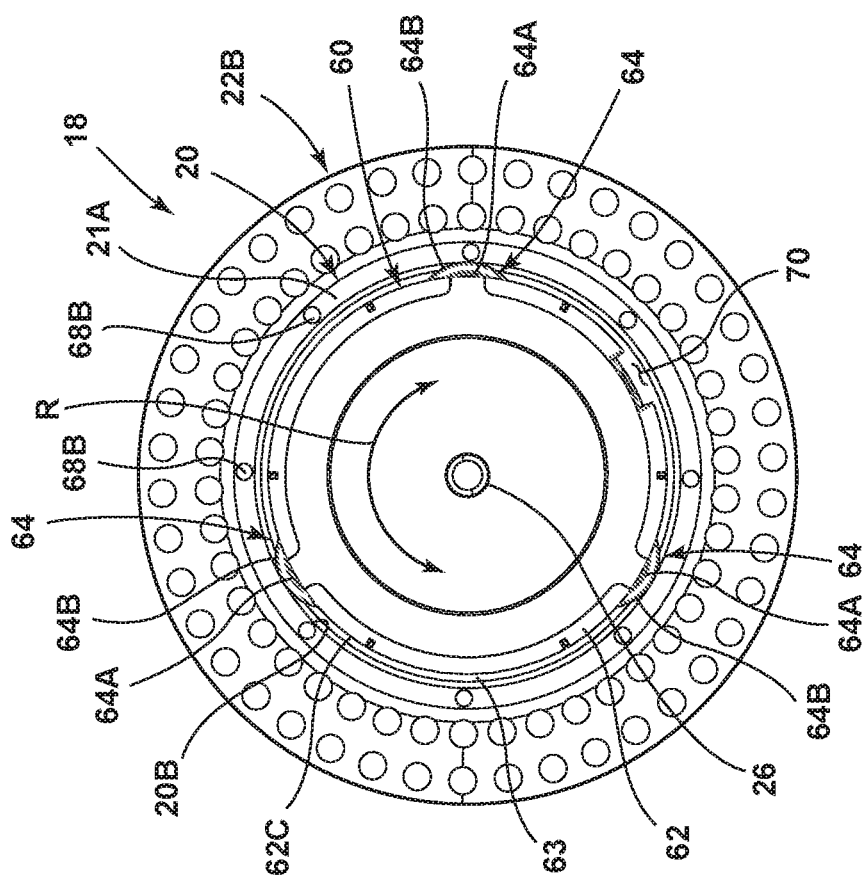
FIG. 6 is a side elevational view of the reel assembly of FIG. 4 in an assembled condition with the cover of FIG. 5 removed.

As further shown in FIG. 4, the motor assembly 60 includes a motor housing 62 having first and second sides 62A, 62B. The output shaft 26 extends outwardly from the first side 62A of the motor housing 62. According to various embodiments, the motor assembly 60 includes at least one reel bearing 64 disposed on the second side 62B of the motor housing 62. Each reel bearing 64 includes a disk 64A that is rotatably coupled to the motor assembly 60. Each disk 64A includes an outer surface 64B that is configured to contact the curved inner surface 20B of the hub 20 and the second cover 22B to allow the reel assembly 18 to rotate about the motor assembly 60, as the motor assembly 60 is fixed in place on the second stanchion 14B. Any suitable structure is contemplated including, but not limited to thrust bearings, roller bearings, and bushings. In the shown embodiment, the outer surface 64B of the reel bearing 64 extends radially outward from an outer radial surface 62C of the motor housing 62, such that a gap 63 (FIG. 6) is defined between the outer radial surface 62C of the motor housing 62 and the curved inner surface 20B of the hollow interior bore 70 or the hub 20, as best shown in FIG. 6. Accordingly, the reel assembly 18 is able to rotate freely about the motor housing 62 as powered by the motor assembly 60. An outer lateral surface of the disks 64A of each reel bearing 64 may be configured to contact the inner rim 208 of the receiving aperture 204 of the second cover 22B to guide rotational movement of the second cover 22B around the motor housing 62.

In some embodiments, the disks 64A of the reel bearings 64 may be comprised of an elastically deformable material (e.g., rubber or plastic) to dampen forces applied between the reel assembly 18 and the motor assembly 60. Accordingly, the disks 64A of the reel bearings 64 may help to protect the reel assembly 18 and the motor assembly 60 from damage. In some embodiments, the disks 64A of the reel bearings 64 may comprise a material with a high coefficient of friction as engaged with the hub 20 of the reel assembly 18 to prevent inadvertent slippage.

Figure 5:
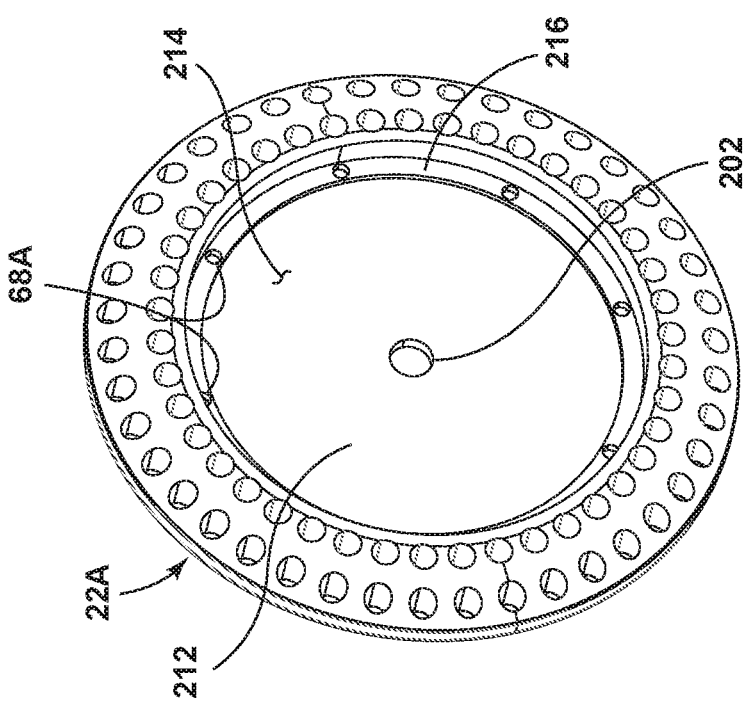
FIG. 5 is a top perspective view of a cover of the reel assembly of FIG. 4.

As further shown in FIG. 4, the motor assembly 60 further includes a motor plate 78 having a disk-shaped body portion 79 with a receiving aperture 79A, through which the output shaft 26 is received. The motor plate 78 is contemplated to be rotationally fixed with the output shaft 26. As shown in FIG. 4, the motor plate 78 extends slightly beyond an axially outer surface 72A of a housing plate 72 disposed on the first side 62A of the motor housing 62. With reference to FIG. 5, the first cover 22A includes an inner surface 212 having a recessed portion 214. The recessed portion 214 includes an inner rim 216 through which the cover attachment features 68A are disposed. Again, the cover attachment features 68A are configured to couple the first cover 22A to the hub 20 at the first side 21A of the hub 20 at the mounting apertures 68B thereof using fasteners 68C. The motor plate 78 may be configured to contact the inner surface 212 of the first cover 22A at the recessed portion 214. When the clutch assembly 27 is engaged, the motor plate 78 becomes rotationally fixed with the first cover 22A. In some embodiments, one or more washers (e.g., a spring washer) may be disposed between the motor plate 78 and the first cover 22A. In some embodiments, the clutch plate 32 and the clutch disk 38 are coupled to the output shaft 26, such that the first cover 22A may be selectively rotationally fixed with the output shaft 26 when the first cover 22A is positively captured between the clutch assembly 27 (at the inner surface 38B of the clutch disk 38 (FIG. 1)) and an outer surface 78A of the motor plate 78.

Referring now to FIG. 6, the reel assembly 18 is shown with the first cover 22A removed to show the motor assembly 60 positioned within the hollow interior bore 70 of the hub 20. In the embodiment shown in FIG. 6, the motor assembly 60 is centered within the hollow interior bore 70 of the hub 20 by the reel bearings 64. Specifically, the disks 64A of the reel bearings 64 are positioned such that the outer surface 64B of the disks 64A are engaged with the curved inner surface 20B of the hub 20. Having three reel bearings 64 in the embodiment of FIG. 6 provides for the triangulated centering feature for the motor assembly 60 relative to the hub 20, such that a gap 63 is provided between the outer radial surface 62C of the motor housing 62 of the motor assembly 60 and the curved inner surface 20B of the hub 20, as the reel assembly 18 rotates around the motor assembly 60 in the direction as indicated by arrow R.

Figure 9:
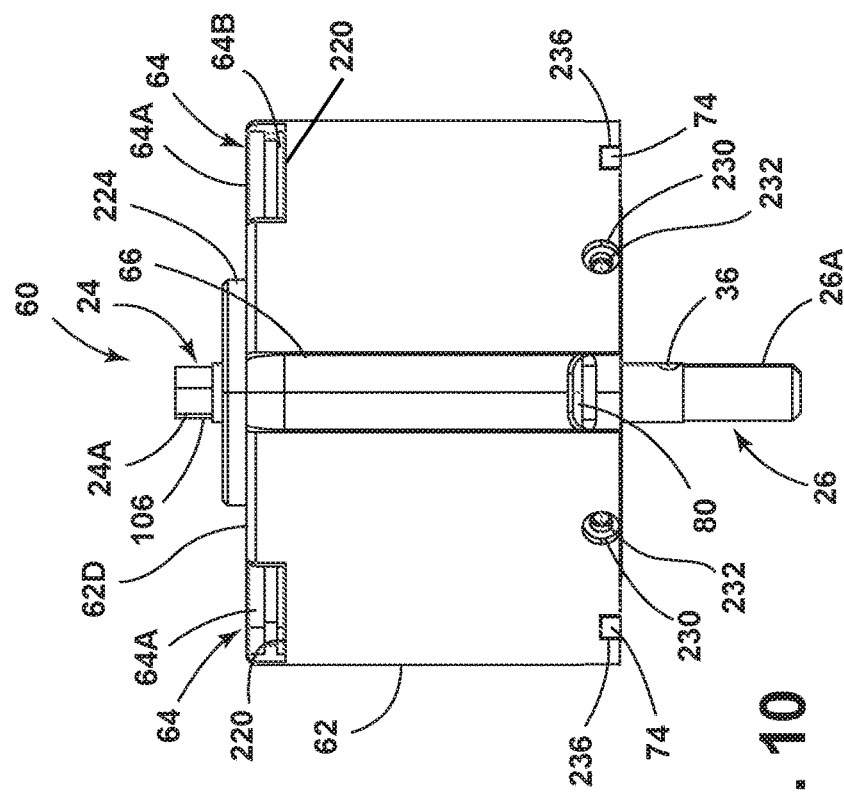
FIG. 9 is a side elevational view of the motor assembly of FIG. 8.
Figure 10:
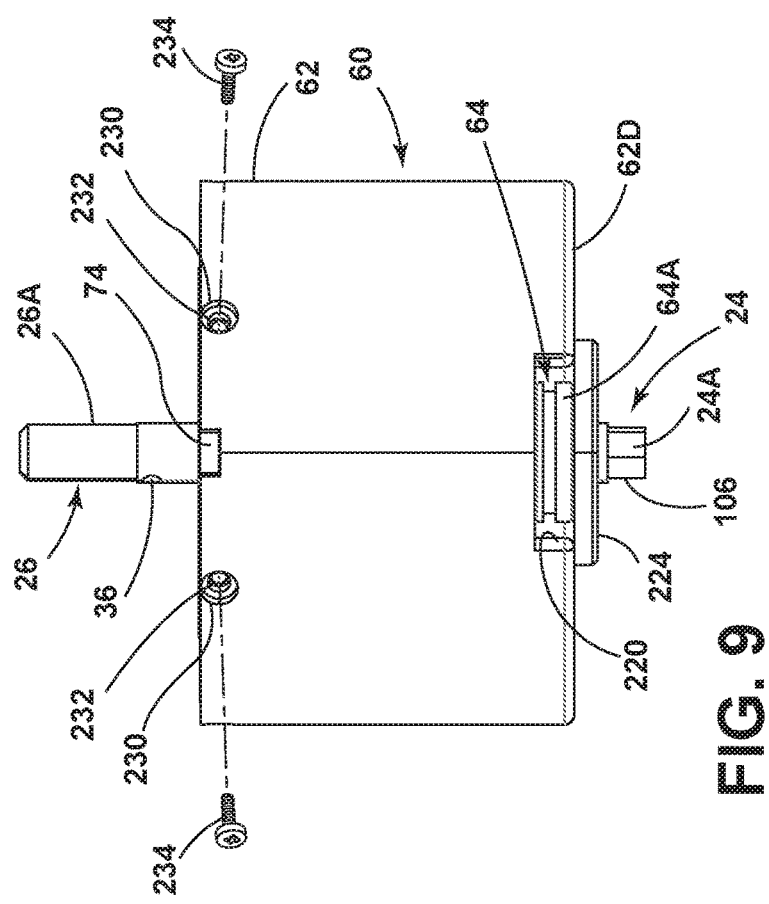
FIG. 10 is a side elevational view of the motor assembly of FIG. 9.

Referring now to FIG. 7, the reel assembly 18 is shown in an assembled condition, wherein the hub 20 is positioned between the first and second covers 22A, 22B. In the embodiment shown in FIG. 7, the reel bearings 64 are positioned within recesses 220 of the motor housing 62 disposed on the second side 62B of the motor housing 62. In this way, outer surfaces 64C of the disks 64A of the reel bearings 64 are substantially flush with or slightly recessed from an outer surface 62D of the second side 62B of the motor housing 62 (as best shown in FIGS. 9 and 10) to prevent inadvertent friction between the reel bearings 64 and the motor bracket 40 (FIG. 1).

Figure 8:
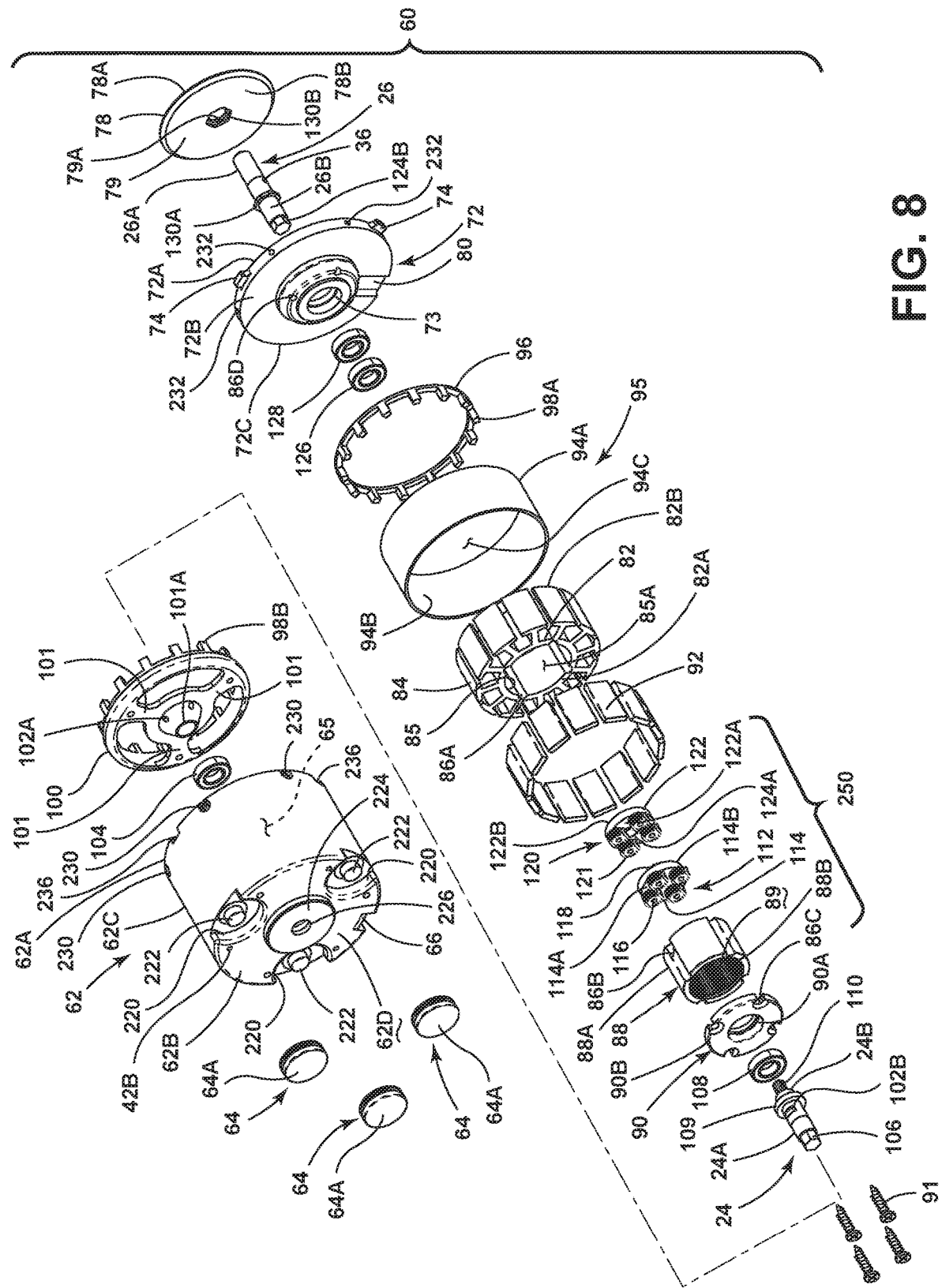
FIG. 8 is an exploded top perspective view of a motor assembly.

Referring now to FIG. 8, the motor assembly 60 includes a gear system 250 disposed within a stator 82 of the motor assembly 60. As specifically shown in FIG. 8, the stator 82 includes one or more stator poles 84 each configured to receive a winding therearound. The windings are configured to generate a magnetic field when receiving power from the one or more lead wires. The stator poles 84 are arranged in a ring configuration to define an interior surface 85 of the stator 82 that further defines an interior space 85A for housing the gear system 250 within the stator 82. In some embodiments, the gear system 250 is axially contained between a first side surface 82A of the stator 82 and a second side surface 82B of the stator 82. The interior surface 85 of the stator 82 includes first key way portions 86A recessed from the interior surface 85 of the stator 82. The first key way portions 86A of the stator 82 are evenly spaced-apart around the interior surface 85 of the stator 82. The gear system 250 further includes a ring gear 88 having an outer surface 88A with second key way portions 86B recessed into the outer surface 88A. The ring gear 88 of the gear system 250 is configured to be received within the interior space 85A of the stator 82. The ring gear 88 further includes a geared interior surface 88B surrounding an interior portion 89 of the ring gear 88. The interior portion 89 of the ring gear 88 is configured to receive a number of gears, as further described below. The gear system 250 further includes a gear plate 90 that is a disk-shaped plate having a receiving aperture 90A and an outer surface 90B. Third key way portions 86C are disposed on and evenly spaced-apart along the outer surface 90B of the gear plate 90. The first, second and third key way portions 86A-86C align with one another to define channels for receiving fasteners 91 that are contemplated to be threadingly engage with mounting apertures 86D disposed on an inner surface 72B of the housing plate 72. In this way, the fasteners 91 couple the stator 82, the ring gear 88, the gear plate 90, and the housing plate 72 together. In some embodiments, the fasteners 91 are configured to be received in the first key way portions 86A and the second key way portions 86B, such that the ring gear 88 is rotationally fixed with respect to the stator 82. In some embodiments, the third key way portions 86C of the gear plate 90 includes a portion configured to receive a head of the fasteners 91, and the mounting apertures 86D of the housing plate 72 includes threading configured to engage a threaded portion of the fasteners 91 to maintain lateral positioning of the stator 82, the ring gear 88, the gear plate 90, and the housing plate 72. In some embodiments, the fasteners 91 are coupled to at least one of the stator 82, the ring gear 88, the gear plate 90, and the housing plate 72 by means of press-fitting. In some embodiments, the stator 82 is rotationally fixed with respect to the housing plate 72, and the housing plate 72 is rotationally fixed with respect to the motor housing 62, such that the stator 82 is rotationally fixed with respect to the motor housing 62.

As further shown in FIG. 8, the motor housing 62 includes the outer radial surface 62C that outwardly extends from the second side 62B of the motor housing 62 to define a hollow interior portion 65 of the motor housing 62. In this way, the motor housing 62 generally comprises a cup-shaped configuration, wherein the first side 62A of the motor housing 62 defines an open top that is closed off by the housing plate 72 in assembly, as best shown in FIG. 11. The component parts shown in FIG. 8 between the housing plate 72 and the motor housing 62 are contemplated to be received and packaged within the hollow interior portion 65 of the motor housing 62 in assembly. In this way, the motor assembly 60 provides for a low-profile packaging to be received within the hub 20 of the reel assembly 18, for powering rotation of the same.

As further shown in FIG. 8, the motor housing 62 further includes a raised boss portion 224 that outwardly extends from the outer surface 62D of the second side 62B of the motor housing 62. A receiving aperture 226 is disposed through the raised boss portion 224 and opens into the hollow interior portion 65 of the motor housing 62. A first portion 24A of the motor shaft 24 extends through the receiving aperture 226 of the motor housing 62 in assembly, as best shown in FIGS. 7 and 12. The first portion 24A of the motor shaft 24 may include a brake couple 106 configured to couple to the brake (as discussed above with reference to FIG. 1). In the embodiment shown in FIG. 8, the brake couple 106 defines a hexagonal-shaped end of the motor shaft 24, however, other geometric configurations are also contemplated for use as the brake couple 106. In the embodiment shown in FIG. 8, the motor assembly 60 further includes a housing bearing 104 that is contemplated to be disposed between the motor shaft 24 and the motor housing 62 to facilitate the rotation of the motor shaft 24 within the motor housing 62. Specifically, the housing bearing 104 is contemplated to be received in an interior portion 228 of the raised boss portion 224 of the motor housing 62, as best shown in FIG. 13. A second portion 24B of the motor shaft 24 includes a first gear 110 coupled to or integrally formed with the motor shaft 24. The first gear 110 is configured to be disposed within the interior portion 89 of the ring gear 88. A ring gear bearing 108 may be disposed between the motor shaft 24 and the gear plate 90 along the second portion 24B of the motor shaft 24 to further facilitate rotation of the motor shaft 24 within the gear plate 90. The motor shaft 24 may also include a radially extending flange 109 disposed between the first and second portions 24A, 24B of the motor shaft 24 that is configured to align the motor shaft 24 laterally with a rotor bracket 100 and the ring gear bearing 108.

With further reference to the embodiment shown in FIG. 8, the ring gear 88 is configured to house a first gear stage 112 within the interior portion 89 thereof. The first gear stage 112 includes a first carrier 114 having first and second sides 114A, 114B. At least one second gear 116 is coupled to the first side 114A of the first carrier 114. In the embodiment shown in FIG. 8, four gears 116 cooperate to define a gear array for the second gear 116 arrangement. The second gear 116 is configured to interconnect the first gear 110 of the motor shaft 24 and the geared interior surface 88B of the ring gear 88. Thus, as the first gear 110 rotates, the first gear 110 drives the second gear 116 within the interior portion 89 of the ring gear 88, such that the second gear 116 causes rotation of the first carrier 114 within the interior portion 89 of the ring gear 88. Thus, the second gear 116 is gearingly engaged with the geared interior surface 88B of the ring gear 88. In various embodiments, the size of the first gear 110, the second gear 116 and the ring gear 88 may vary such that the rotational speed of the first carrier 114 is less than, equal to, or greater than the rotational speed of the first gear 110. The first gear stage 112 includes an output gear 118 coupled to or integrally formed with the first carrier 114 along the second side 114B of the first carrier 114. Typically, the output gear 118 is rotationally fixed with respect to the first carrier 114.

As further shown in the embodiment of FIG. 8, the motor assembly 60 includes a second gear stage 120 that is also configured to be received within the interior portion 89 of the ring gear 88. Like the first gear stage 112, the second gear stage 120 includes a second carrier 122 having first and second sides 122A, 122B. At least one third gear 121 is coupled to the first side 122A of the second carrier 122. In the embodiment shown in FIG. 8, four gears 121 cooperate to define a gear array for the third gear 121 configured to couple to the output gear 118 and the geared interior surface 88B of the ring gear 88. In this way, the third gear 121 interconnects the output gear 118 of the first gear stage 112 and the geared interior surface 88B of the ring gear 88. Thus, as the output gear 118 rotates, the output gear 118 drives the third gear 121 within the interior portion 89 of the ring gear 88, such that the third gear 121 causes rotation of the second carrier 122 within the interior portion 89 of the ring gear 88. Thus, the third gear 121 is gearingly engaged with the geared interior surface 88B of the ring gear 88. In various embodiments, the size of the output gear 118, the third gear 121 and the ring gear 88 may vary, such that the rotational speed of the second carrier 122 is less than, equal to, or greater than the rotational speed of the first carrier 114. The second carrier 122 includes a first output coupling portion 124A defined in the embodiment of FIG. 8 as a hexagon-shaped aperture disposed through the second carrier 122.

With further reference to the embodiment shown in FIG. 8, the output shaft 26 is shown having first and second portions 26A, 26B. The first portion 26A of the output shaft 26 extends outwardly from the motor plate 78 through the receiving aperture 79A thereof, as best shown in FIGS. 4 and 11. As noted above, the first portion 26A of the output shaft 26 also extends outwardly from the receiving aperture 202 of the first cover 22A. The second portion 26B of the output shaft 26 includes a second output coupling portion 124B disposed at a axially inward end thereof, such that the first output coupling portion 124A of the second carrier 122, and the second output coupling portion 124B of the output shaft 26 are configured to couple the second carrier 122 to the output shaft 26 in a rotationally fixed manner. The second portion 26B of the output shaft 26 extends through an aperture 73 of the housing plate 72. In various embodiments, the motor assembly 60 includes at a first housing plate bearing 126 and a second housing plate bearing 128 that are disposed between the output shaft 26 and the housing plate 72 to facilitate rotation of the output shaft 26 within the aperture 73 of the housing plate 72, as best shown in FIG. 13. The output shaft 26 further includes a first motor plate coupling portion 130A disposed between the first and second portions 26A, 26B thereof. The motor plate 78 includes a second motor plate coupling portion 130B disposed on the second side 78B of the motor plate 78 at receiving aperture 79A. The first motor plate coupling portion 130A and the second motor plate coupling portion 130B are configured to couple the motor plate 78 to the output shaft 26. In this way, the motor plate 78 is rotationally fixed with respect to the output shaft 26.

As further shown in FIG. 8, a rotor assembly 95 includes one or more magnets 92, a rotor barrel 94 configured to house the one or more magnets 92, a rotor cap 96, and a rotor bracket 100. The one or more magnets 92 may be disposed adjacent to an outer perimeter of the stator 82 in assembly. In various embodiments, the one or more magnets 92 are configured to be attracted to the magnetic field generated by the multiple windings disposed on the stator poles 84 to rotate the rotor assembly 95 about the stator 82. The rotor barrel 94 includes an outer surface 94A and an inner surface 94B, wherein the inner surface 94B defines a hollow interior portion 94C of the rotor barrel 94. The ring defined by the magnets 92 may be housed within the hollow interior portion 94C of the rotor barrel 94. A rotor cap 96 is coupled to an outer edge of the rotor barrel 94 and couples to the one or more magnets 92 to maintain the positioning of the one or more magnets 92 within the rotor barrel 94. The rotor cap 96 may include a first set of retaining prongs 98A extending laterally inward from the rotor cap 96 into the hollow interior portion 94C of the rotor barrel 94 and configured to couple to the one or more magnets 92 to maintain a desired spacing between the one or more magnets 92 as positioned within the hollow interior portion 94C of the rotor barrel 94.

The rotor assembly 95 further includes a rotor bracket 100 that is configured to be operably coupled to the rotor barrel 94. The rotor bracket 100 may include a second set of retaining prongs 98B extending laterally inward from the rotor bracket 100 into the hollow interior portion 94C of the rotor barrel 94 retain the magnets 92 at a desired spacing interval. The rotor bracket 100 also includes one or more rotor supports 101 extending radially inward towards an aperture 101A that is configured to receive first portion 24A of the motor shaft 24 therethrough. The rotor bracket 100 also includes a first rotor bracket attachment feature 102A, while the motor shaft 24 includes a second rotor bracket attachment feature 102B which together are configured to engage one another to operably couple the rotor bracket 100 to the motor shaft 24. Typically, the first rotor bracket attachment feature 102A and the second rotor bracket attachment feature 102B are configured to couple the rotor bracket 100 to the motor shaft 24, such that the motor shaft 24 is rotationally fixed with respect to the rotor bracket 100.

As further shown in FIG. 8, the second side 62B of the motor housing 62 includes mounting stems 222 positioned within the recesses 220. In assembly, the disks 64A of the reel bearings 64 are rotatably mounted on the mounting stems 222. As further shown in FIG. 8, the motor housing 62 includes a plurality of mounting apertures 230 which are configured to receive fasteners 234 (FIG. 9) that further engage mounting apertures 232 disposed along a perimeter portion 72C of the housing plate 72. In this way, the fasteners 234 fixedly couple the housing plate 72 to the motor housing 62 to close the hollow interior portion 65 of the motor housing 62 when the above-mentioned components are received therein, as best shown in FIG. 9. In some embodiments, the housing plate 72 and the motor housing 62 may be coupled via press-fitting or any another suitable means. The housing plate 72 may include one or more alignment tabs 74 extending outwardly from the perimeter portion 72C thereof. The motor housing 62 a further includes recesses 236 disposed along the first side 62A. In use, the alignment tabs 74 help to properly align the housing plate 72 and the motor housing 62 when received within the recesses 236 of the motor housing 62, as best shown in FIGS. 10 and 11. The alignment tabs 74 may also prevent rotation of the housing plate 72 respective to the motor housing 62.

Referring now to FIG. 10, the alignment tabs 74 help to align the housing plate 72 and the motor housing 62, such that together they define a lead wire outlet 80. The motor assembly 60 further defines a lead wire slot 66 in an outer portion of the motor housing 62 for receiving the one or more lead wires. In the shown embodiment, the lead wire slot 66 extends along an outer surface of the motor housing 62 from the lead wire outlet 80 towards the first lead wire aperture 46A of second stanchion 14B (FIG. 1).

Referring now to FIG. 13, the motor assembly 60 includes the gear system 250 disposed within the motor assembly 60. The stator 82 of the motor assembly 60 may be rotationally fixed with respect to the motor housing 62, the housing plate 72, the ring gear 88, and the gear plate 90. The rotor assembly 95, including the rotor barrel 94, the rotor cap 96, the rotor bracket 100, and one or more magnets 92, is configured to rotate with respect to the stator 82. The rotor assembly 95 is coupled to the motor shaft 24 as described above. Typically, the motor shaft 24 is rotationally fixed with respect to the rotor assembly 95. As shown in FIG. 13, the motor shaft 24 includes the first gear 110 disposed within the ring gear 88. The first gear 110 is coupled to the second gear 116. The second gear 116 is coupled to the first gear 110 and the ring gear 88, and is configured to rotate the first carrier 114 within the interior portion 89 of the ring gear 88. The first carrier 114 includes the output gear 118 coupled to the third gear 121. The third gear 121 is coupled to both the output gear 118 and the ring gear 88, and is configured to rotate the second carrier 122 within the interior portion 89 of the ring gear 88. The second carrier 122 is coupled to the output shaft 26 as described above, such that the output shaft 26 is rotationally fixed with respect to the second carrier 122. The output shaft 26 extends through the housing plate 72 at the aperture 73 thereof, and couples to the motor plate 78 at the first and second motor plate coupling portions 130A, 130B. Typically the motor plate 78 is rotationally fixed with respect to the output shaft 26. In some embodiments, the motor assembly 60 is configured to drive the reel assembly 18 (FIG. 4) by means of a direct drive (i.e., the rotor assembly is rotationally fixed and at the same speed with respect to the reel assembly 18). In some embodiments, the reel assembly 18 may comprise the rotor assembly 95.

With the motor shaft 24 coupled to the gear system 250 and the output shaft 26 coupled the gear system 250, rotation of the motor shaft 24, as powered by the motor assembly 60 in the direction as indicated by arrow R1 correlates into rotation of the output shaft 26 in the direction as indicated by arrow R2. As noted above the rotation of the motor shaft 24 and the output shaft 26 may be different depending on the arrangement of the gear system 250, but is contemplated to provide a high torque configuration for the output shaft 26.

In the shown embodiment, the motor assembly 60 is coupled to the reel assembly 18 of the downrigger assembly 10 (best shown in FIG. 1). However, it is contemplated that the motor assembly 60 of the present disclosure may be used to power any number of devices not specifically disclosed in the present disclosure. Accordingly, the motor assembly 60 may be removably coupled to a variety of devices as desired by the user.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or moveable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

What is claimed is:

1. A reel assembly, comprising:
an annular hub having a hollow interior bore;
a motor assembly having a motor housing sized to be received within the hollow interior bore of the annular hub;
a rotor assembly disposed around a stator within with an interior cavity of the motor housing for rotation within the interior cavity of the motor housing;
a gear system disposed within the interior cavity of the motor housing;
an output shaft interconnecting the annular hub and the gear system; and
a clutch assembly operably coupled to the output shaft, wherein the clutch assembly is operable to selectively interconnect the annular hub with the output shaft, wherein the gear system is disposed within an interior space defined by the stator.

2. The reel assembly of claim 1, wherein the gear system includes a ring gear having an interior portion defined by a geared interior surface.

3. The reel assembly of claim 2, wherein the gear system further includes a first gear and a first carrier having a second gear disposed within the interior portion of the ring gear.

4. The reel assembly of claim 3, wherein the ring gear is rotationally fixed and axially aligned with respect to one of the rotor assembly and the stator.

5. The reel assembly of claim 1, wherein the annular hub is configured to rotate with respect to the stator.

6. The reel assembly of claim 1, wherein the annular hub includes an inner surface surrounding the hollow interior bore.

7. The reel assembly of claim 6, wherein the motor assembly includes one or more reel bearings having rotatable disks that outwardly extend from a radial outer surface of the motor housing to engage the inner surface of the annular hub.

\* \* \* \* \*